United States Patent
Ledvora

(10) Patent No.: US 11,686,645 B2
(45) Date of Patent: Jun. 27, 2023

(54) WATER DETECTOR CLIP

(71) Applicant: Joseph Ledvora, Itasca, IL (US)

(72) Inventor: Joseph Ledvora, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 0 days.

(21) Appl. No.: 17/686,543

(22) Filed: Mar. 4, 2022

(65) Prior Publication Data

US 2022/0390314 A1 Dec. 8, 2022

Related U.S. Application Data

(60) Provisional application No. 63/171,768, filed on Apr. 7, 2021.

(51) Int. Cl.
| | |
|---|---|
| *G01M 3/16* | (2006.01) |
| *F24H 15/12* | (2022.01) |
| *H01R 4/48* | (2006.01) |
| *H01R 4/62* | (2006.01) |
| *H01R 11/09* | (2006.01) |
| *H01R 4/26* | (2006.01) |
| *H01R 33/06* | (2006.01) |

(52) U.S. Cl.
CPC ............ *G01M 3/165* (2013.01); *F24H 15/12* (2022.01); *H01R 4/26* (2013.01); *H01R 4/48* (2013.01); *H01R 4/62* (2013.01); *H01R 11/09* (2013.01); *H01R 33/06* (2013.01); *H01R 2201/20* (2013.01)

(58) Field of Classification Search
CPC .......... G01M 3/165; F24H 15/21; H01R 4/26; H01R 4/48; H01R 4/62; H01R 11/06; H01R 33/06; H01R 2201/20
See application file for complete search history.

(56) References Cited

U.S. PATENT DOCUMENTS

| | | | |
|---|---|---|---|
| 6,175,310 B1* | 1/2001 | Gott | G01M 3/165 73/40 |
| 10,168,293 B2* | 1/2019 | Sakunenko | G01N 27/416 |
| 10,502,654 B1* | 12/2019 | Schroeder | G01M 3/165 |
| 2010/0271212 A1* | 10/2010 | Page | A61F 13/42 340/573.1 |
| 2011/0187393 A1* | 8/2011 | Vokey | G01M 3/16 324/694 |
| 2017/0363501 A1* | 12/2017 | Franz | G01M 3/165 |
| 2020/0256755 A1* | 8/2020 | Wakayama | G01M 3/165 |
| 2020/0393321 A1* | 12/2020 | Shevelow | H01B 7/04 |
| 2022/0056698 A1* | 2/2022 | Ladick | G01M 3/042 |
| 2022/0205862 A1* | 6/2022 | Rehnström | G01M 3/12 |

* cited by examiner

*Primary Examiner* — Alexander A Mercado
(74) *Attorney, Agent, or Firm* — Miller & Martin PLLC; Stephen J. Stark

(57) ABSTRACT

An electric clip, such as may be utilized with a leak detector, has a base which receives an insert to secure an inserted material, such as a mesh, there between. The insert has an arm with opposing hooks which pass through a first slot in a biased manner and then spring out once through to provide an assembled configuration. The clip can be secured to the material, such as by directing fingers through a second slot in a biased manner which then return once through to retain on a ledge.

20 Claims, 2 Drawing Sheets

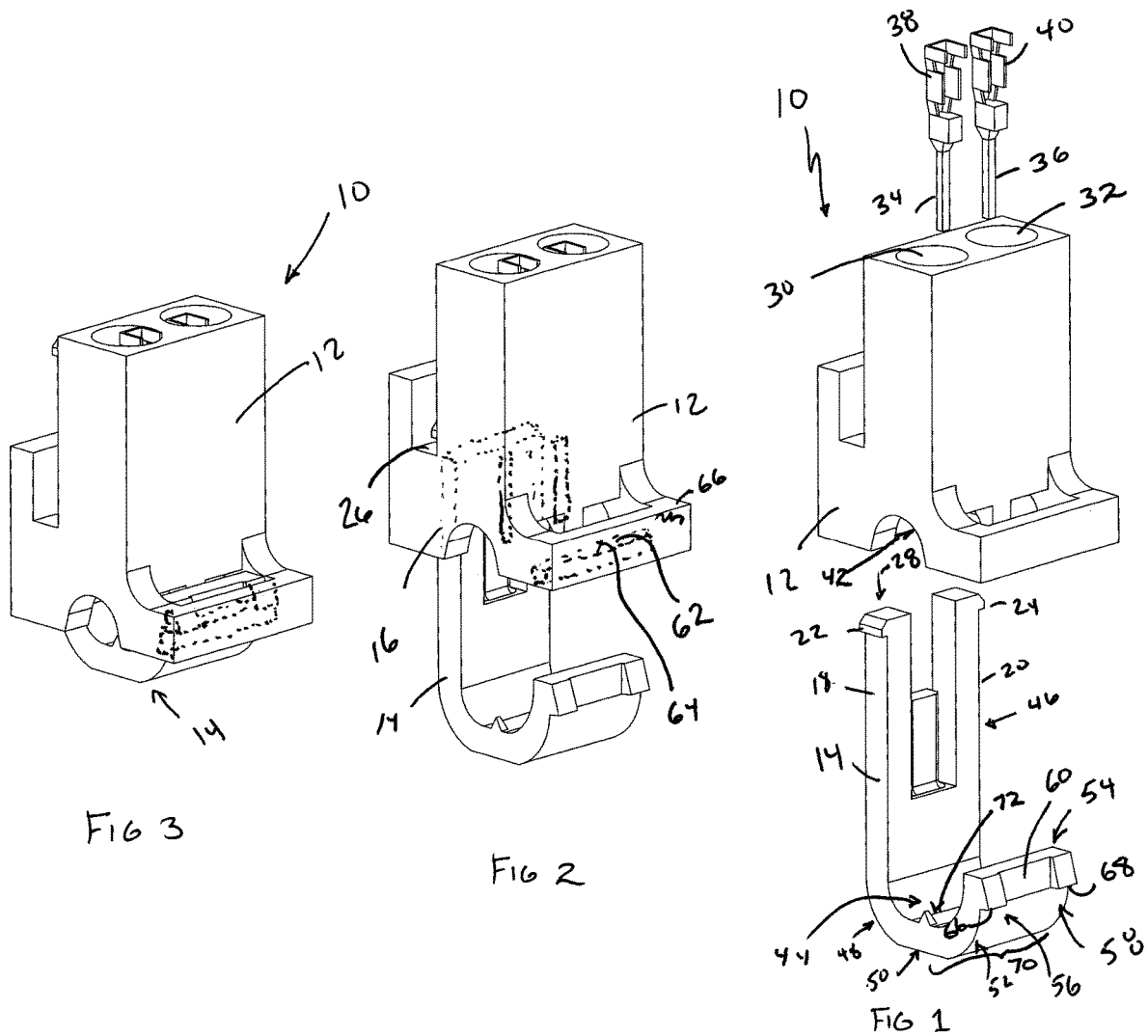

US 11,686,645 B2

WATER DETECTOR CLIP

CLAIM OF PRIORITY

This application claims the benefit of U.S. Provisional Application No. 63/171,768 filed Apr. 7, 2021, which is incorporated by reference herein in its entirety.

FIELD OF THE INVENTION

The present invention relates to sensors utilized to detect water and more particularly to clips utilized with water or leak detectors such as those utilized with hot water heaters.

BACKGROUND OF THE INVENTION

Rheem Manufacturing Company makes a water heater valve shut off powered by household current that shuts off a valve when a leak is detected. That type of detection method utilizes a plastic mesh woven in a cylindrical shape with two sets of two wires attached near an end. When water is present in the mesh, the water via capillary action moves toward the two sets of wires. The shut off valve electronics detect a drop in resistance at the wires caused by the wetness, and thereby activate the motor to turn the valve into the OFF position. This technology is described in U.S. Pat. No. 10,677,494, incorporated herein by reference in its entirety.

Consistently locating the wires relative to each other in contact with the mesh has proven to be a challenge.

SUMMARY OF THE INVENTION

It is an object of many embodiments of the present invention to provide an improved way of connecting electronics to the water detector so that when sensing a leak a unit can power a motor which can turn the valve to an off position. Connecting wiring to the weave can benefit from improvements to prior art technology.

It is another object of many embodiments of the present invention to provide an improved clip for use in connecting electronics to a leak detector mesh or weave.

It is another object of many embodiments of the present invention to provide an improved water detector clip for use in connecting electronic wires to mesh so as to sense a leak as would be distributed along the weave through capillary action or otherwise so as to drop resistance between sets of wires as could be connected to the weave by the clip.

Accordingly, in accordance with the presently preferred embodiment of the present invention a clip is provided to connect a mesh or weave to electronics associated with a processor and a motor for turning a valve to an off position upon sensing a leak by a leak detector.

The pieces of a clip may be designed preferably to be shipped in an open position whereby they may be attached, when not completely closed, to a mesh or weave which can be inserted by a manufacturer or other personnel into the clip and then be closed there about so as to complete the assembly. The pieces can be pressed together for a semi-permanent latching, possibly able to be separated by pinching the hooks of one piece or otherwise. Terminals associated with the clip can be off the shelf of various components and can eliminate tooling and testing. Appropriate plating can be specified for the terminals. The clip can snap in place around the mesh in a location desired by the user or manufacturer. The snapping action can embed and/or anchor the terminals into the weave. When resistance across the terminals drops, the electronics recognizes the wet condition to activate the motor to shut the valve.

BRIEF DESCRIPTION OF THE DRAWINGS

The particular features and advantages of the inventions with other objects will become apparent from the following description taken in connection with the accompanying drawings in which:

FIG. 1 is a side exploded view of a presently preferred embodiment of the present invention;

FIG. 2 is a side perspective view of the presently preferred embodiment of FIG. 1 in an open, or partially open, configuration;

FIG. 3 is a side perspective view of the presently preferred embodiment of FIGS. 1-2 in a closed configuration.

DETAILED DESCRIPTION OF THE PREFERRED EMBODIMENT

Figure 4:
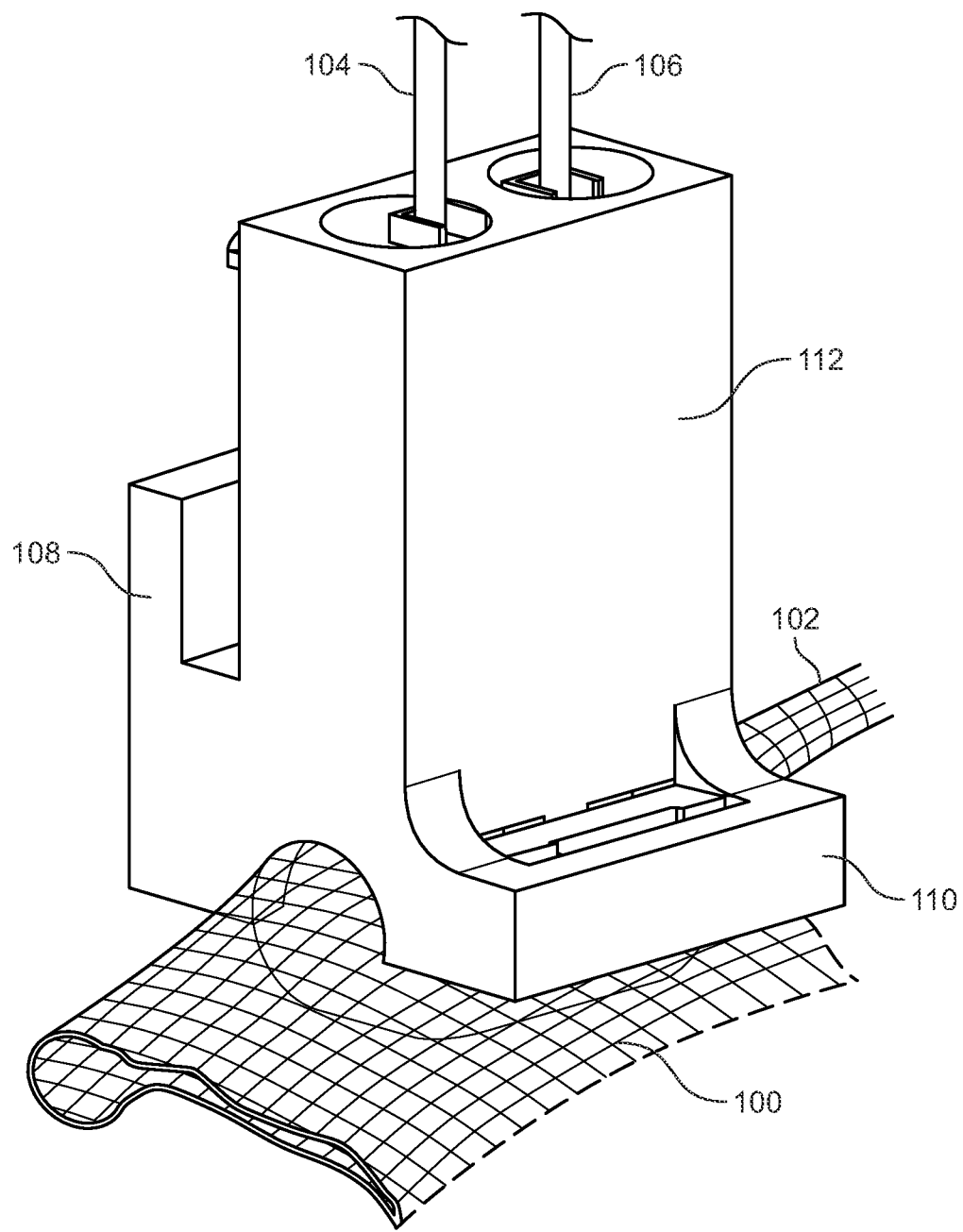
FIG. 4 is a side perspective view of the presently preferred embodiment of FIGS. 1-3 in a closed configuration with a weave, such as a portion of a leak detector, inserted therein.

FIG. 1 shows an exploded view of a clip 10 for use with various electrical systems, such as to join a pair of wires with a mesh, such as a mesh or weave utilized with leak detectors such as those manufactured by the Rheem Manufacturing Company or others. The clip may be manufactured in two pieces such as a base 12 and an insert 14. The base 12 may have a first slot 16 into which the sides 18,20 of the insert 14 are directed until the first hooks 22,24 extend past shoulder 26 of the base 12 to retain the insert 14 in the base 12 such as shown in FIG. 2. This configuration may be an assembled, but open configuration, or at least partially open configuration. The hooks 22,24 may be deflected towards one another when inserted into the channel and then are biased back to extend beyond the first slot 16 when past the shoulder 26. The clip 10 may be shipped in the configurations of FIG. 1 or 2 for various embodiments, or others. The first hooks 22,24 may be at a first end 28 of the insert 12. First hooks 22,24 may be useful to maintain the clip 10 in a partially open or open configuration.

First and second bores 30,32 in the base 14 receive terminals 34,36 with wire connectors 38,40 connected thereto. The connectors 38,40 are preferably connected to the terminals 34,36 before being inserted into the bores 30,32, but other designs may operate differently. The terminals 34,36 preferably extend into first channel 42 of the base 12, if not into second channel 44 of the insert 14 when in a closed configuration as shown in FIGS. 3 and 4. The terminals 34,36 may be secured, directly or indirectly in the bores 30,32 such as with adhesives, press fitting, and/or by other mechanism, at the terminals 34,36 and/or the connectors 38,40. Bores 30,32 and/or terminals 34,36 may be parallel to one another.

The hooks 22,24 of the insert preferably are at end 28 which may be an end of an arm 46. The arm 46 may extend somewhat linearly until a first bend 48 transitions into an elbow 50. The elbow may transition at a second bend 52 to hand 54. Hand 54 may have first and second fingers 56,58 which may act as hooks as will be explained in further detail below. Hand 54, elbow 50 and a portion of arm 46 may cooperate to form the second channel 44 along with first and second bends 48,52.

The hand 54 may have fingers 56,58 spaced by a gap 60 which may assist in providing at least some resiliency for the fingers 56,58. Fingers may pass along with a portion of hand 54 through a second slot 62 in the base and be retained therein by a ledge 64 when bottoms 66,68 of the fingers 56,58 extend above a top of the ledge 64 to thereby lock the clip 10 in a closed configuration. The second slot 62 may have a width 66 sufficient to permit the hand 54 to be biased towards the arm 46 for installation to then spring back into a locked configuration once the fingers 56,58 pass through the second slot 62 as shown in FIGS. 3 and 4.

For at least some embodiments, ridge or point(s) 72 may be disposed in the second slot 62, possibly oppositely oriented or directed relative to terminals 34, 36 to potentially assist in directing inserted material into engagement with the terminals 34,36. Ridge 72 may extend a depth 70 of the second channel 44.

First and second slots 16,62 may be parallel in the base 12. Fingers 56,58 may be parallel to one another. Hand 54 may be parallel to arm 46.

FIG. 4 shows two different ways that a mesh or weave 100,102 may be inserted into the clip 10. Specifically, mesh 100 may be somewhat planar, or at least more planar than mesh 102 when installed in the clip 10. Some of mesh 100 is in the first and/or second channels 42,44 where the terminals pierce into or otherwise connect with the mesh 100 by being held in firm engagement therewith in the closed configuration shown in FIGS. 3 and 4. Some of mesh may be caught by hand 54 into second slot 62 and may extend outwardly beyond hand 54 for at least some embodiments.

Still other embodiments may permit more of a bunching or rolling of the mesh 102 which could be somewhat cylindrical in shape as illustrated to fit within the first and second channels 42,44 without extending into the second channel 62 or interfering with the connection of the hand 54 in the second channel 62. It may be that the mesh 102 is provided as a cylinder or it could be bunched or rolled to fit within the first and second channels 42,44 for such an embodiment.

With the fingers 56,58 locking the insert 14 to the base 12 with a mesh 100 and/or 102 installed, the clip 10 securely imbeds or at least places the terminals 34,36 in contact with the mesh to evaluate resistance therebetween to provide a signal through wires or leads 104,106 to the electronics of a leak detector as shown and described in U.S. Pat. No. 10,677,494, or other devices that may wish to evaluate the electrical properties of material retained by clip 10 for various functions. When water is detected, the resistance across or between the terminals 34,36 decreases, which is sensed by an RS or other unit to then activate a motor to turn a valve to an OFF position to secure operation of a water heater or provide other functions in other systems.

In order to prevent inadvertent detachment, shields 108, 110 may be useful. Shield 108 may be spaced outwardly of first slot 16 from body 112. Body 112 may contain bores 30,32. Shield 110 may be spaced outwardly of second slot 62 from body 112. Shields 108, 110 may be parallel to one another and/or to the body 112.

In order to release a clip 10 from a mesh 100 and/or 102 after installation may be performed by inserting a blade of a screwdriver or other device into gap 60, pushing towards body to disengage the fingers 56,58 from ledge 64 and pushing the hand 54 out of the second slot 62. This should transition the clip 10 to the open, or partially open configuration of FIG. 2 to be able to then disengage the mesh 100 and/or 102 to then reinstall the clip 10 on the mesh 100 and/or 102 for a better connection and or on a new mesh.

The clip 10 may be particularly inexpensively for some embodiments, such as of plastic and/or other components. Some embodiments envision shipping partially assembled clips 10 such as in the open configuration of FIG. 2 to customers such as manufacturers, or possibly end customers, to complete installation. If shipped to a manufacturer, the clip 10 may be closed about a mesh 100 and/or 102 on an assembly line or otherwise as shown in FIG. 4. The insert 14 may be directed further into the base 12 for a semi-permanent latching for at least some embodiments.

The terminals 34,36 could be off the shelf components to simplify tooling and testing. The connectors 38,40 could be various constructions. The desired plating and/or performance characteristics may be specified to the manufacturer.

Numerous alterations of the structure herein disclosed will present themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having set forth the nature of the invention, what is claimed herein is:

What is claimed is:

1. An electrical clip comprising:
a base having a first slot terminating at a shoulder, and first and second bores extending through the base;
first and second terminals located in the first and second bores, respectively;
an insert having at least a first hook;
wherein the at least first hook is directed through the slot in a first direction past the shoulder to be restrained by the shoulder from removal in a direction opposite the first direction in an assembled configuration,
and the base and insert cooperate to restrain an inserted material securely between the insert and the base in contact with the first and second terminals in a closed configuration.

2. The electrical clip of claim 1 wherein the base and the insert are plastic.

3. The electrical clip of claim 1 wherein the insert has a second hook, said first and second hook oppositely oriented and located on an arm.

4. The electrical clip of claim 1 wherein the first and second bores are parallel.

5. The electrical clip of claim 4 further comprising connectors connected to the first and second terminals, respectively.

6. The electrical clip of claim 5 wherein the first and second terminals are secured in the first and second bores with one of press fitting and adhesives.

7. The electrical clip of claim 1 wherein the insert has a second hook, said first and second hooks located at a first end of an arm of the insert.

8. The electrical clip of claim 7 wherein the hooks resiliently deflect while passing through the slot and then extend beyond the shoulder in the assembled configuration.

9. The electrical clip of claim 8 wherein the base has a first channel in communication with the first and second bores and the first and second terminals extend into the first channel.

10. The electrical clip of claim 9 wherein the insert has a second channel which cooperates with the first channel in the closed configuration to retain the material therein.

11. The electrical clip of claim 10 wherein the second channel is formed of a portion of an arm, a first bend, an elbow, a second bend and a hand, said hand directed toward the base in the closed configuration.

12. The electrical clip of claim 11 wherein the base further comprises a second slot, and the insert has a first finger connected to the hand, said first finger at least assisting in retaining the hand in the second slot in the closed configuration.

13. The electrical clip of claim 12 wherein the insert has a second finger spaced from the first finger by a gap, said first and second fingers assisting in preventing the hand from pulling out of the slot in the closed configuration.

14. The electrical clip of claim 13 wherein the first and second fingers are biased as they proceed through the second slot and then are restrained by a ledge at an end of the second slot in the closed configuration.

15. The electrical clip of claim 12 wherein the first and second slots are parallel.

16. The electrical clip of claim 15 wherein the fingers are spaced from the second slot in the assembled configuration and then pass through the slot and are restrained by the ledge in the closed configuration.

17. The electrical clip of claim 16 further comprising one of points and a ridge in the second channel opposite the terminals to assist in retaining the material in the closed configuration.

18. The electrical clip of claim 17 wherein the inserted material is a mesh.

19. The electrical clip of claim 18 further comprising a processor connected to the first and second terminals, said processor detecting a drop in resistance between the first and second terminals and then initiating an action.

20. The electrical clip of claim 19 wherein the processor is a portion of a leak detector.

\* \* \* \* \*